United States Patent
Mortensen

(10) Patent No.: US 11,345,593 B2
(45) Date of Patent: May 31, 2022

(54) SYSTEM AND PROCESS FOR SYNTHESIS GAS PRODUCTION

(71) Applicant: HALDOR TOPSØE A/S, Kgs. Lyngby (DK)

(72) Inventor: Peter Mølgaard Mortensen, Roskilde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 279 days.

(21) Appl. No.: 16/347,376

(22) PCT Filed: Nov. 15, 2017

(86) PCT No.: PCT/EP2017/079242
§ 371 (c)(1),
(2) Date: May 3, 2019

(87) PCT Pub. No.: WO2018/108413
PCT Pub. Date: Jun. 21, 2018

(65) Prior Publication Data
US 2019/0300366 A1    Oct. 3, 2019

(30) Foreign Application Priority Data

Dec. 13, 2016 (DK) .......................... PA 2016 00762

(51) Int. Cl.
*C01B 3/48* (2006.01)
*B01D 53/04* (2006.01)
(Continued)

(52) U.S. Cl.
CPC .............. *C01B 3/48* (2013.01); *B01D 53/047* (2013.01); *B01D 53/0462* (2013.01);
(Continued)

(58) Field of Classification Search
CPC .... C01B 3/48; B01D 53/0462; B01D 53/047; B01D 53/229
See application file for complete search history.

(56) References Cited

U.S. PATENT DOCUMENTS

| 5,000,925 A | 3/1991 | Krishnamurthy et al. |
| 6,416,568 B1 | 7/2002 | Wallace et al. |
| (Continued) | | |

FOREIGN PATENT DOCUMENTS

| EP | 0700708 A1 | 3/1996 |
| EP | 2181962 A1 | 5/2010 |
| (Continued) | | |

OTHER PUBLICATIONS

International Search Report (PCT/ISA/210) and Written Opinion (PCT/ISA/237) dated Feb. 13, 2018, by the European Patent Office as the International Searching Authority for International Application No. PCT/EP2017/079242.
(Continued)

*Primary Examiner* — Paul A Wartalowicz
(74) *Attorney, Agent, or Firm* — Buchanan Ingersoll & Rooney P.C.

(57) ABSTRACT

A hydrogen production system including a steam reformer unit, a steam addition line arranged to add steam upstream the steam reformer unit, a hydrogen membrane unit comprising a hydrogen permeable membrane and being arranged to allow at least a part of a reformed stream and a hydrocarbon feed stream to pass on different sides of a hydrogen permeable membrane, so that hydrogen passes from the reformed stream into the hydrocarbon feed stream, thereby forming said hydrogen enriched hydrocarbon stream, and a separation unit downstream the first side of the hydrogen membrane unit, where the separation unit is arranged to separating the reformed stream exiting the first side of the
(Continued)

hydrogen membrane unit into a hydrogen product gas and an off-gas.

15 Claims, 1 Drawing Sheet

(51) Int. Cl.
    *B01D 53/047*     (2006.01)
    *B01D 53/22*     (2006.01)
    *C01B 3/34*     (2006.01)
    *C01B 3/50*     (2006.01)

(52) U.S. Cl.
    CPC .............. *B01D 53/229* (2013.01); *C01B 3/34* (2013.01); *C01B 3/501* (2013.01); *B01D 53/22* (2013.01); *B01D 2256/16* (2013.01); *B01D 2256/20* (2013.01); *B01D 2257/504* (2013.01); *C01B 2203/0233* (2013.01); *C01B 2203/0283* (2013.01); *C01B 2203/043* (2013.01); *C01B 2203/0405* (2013.01); *C01B 2203/046* (2013.01); *C01B 2203/0475* (2013.01); *C01B 2203/0811* (2013.01); *C01B 2203/127* (2013.01); *C01B 2203/1258* (2013.01); *C01B 2203/142* (2013.01); *C01B 2203/146* (2013.01); *C01B 2203/148* (2013.01)

(56) References Cited

U.S. PATENT DOCUMENTS

| | | | |
|---|---|---|---|
| 2005/0158236 A1* | 7/2005 | Rei | B01J 8/0285 |
| | | | 48/61 |
| 2006/0230927 A1* | 10/2006 | Xie | B01D 69/12 |
| | | | 95/55 |
| 2007/0269690 A1 | 11/2007 | Doshi et al. | |
| 2010/0024476 A1* | 2/2010 | Shah | B01D 53/002 |
| | | | 62/617 |
| 2013/0081328 A1 | 4/2013 | Jadhav | |
| 2014/0357737 A1 | 12/2014 | Abbott | |
| 2015/0259202 A1* | 9/2015 | Dybkjær et al. | C10K 3/04 |
| | | | 518/704 |
| 2016/0365591 A1* | 12/2016 | Goebel | H01M 8/0668 |
| 2017/0022056 A1* | 1/2017 | Christensen | C10L 3/103 |

FOREIGN PATENT DOCUMENTS

| | | |
|---|---|---|
| JP | 2876194 B2 | 3/1999 |
| WO | 2013038140 A1 | 3/2013 |

OTHER PUBLICATIONS

Search Report dated May 24, 2017, by the Danish Patent Office for Application No. PA 2016 00762.

Office Action dated Jan. 28, 2021, by the Intellectual Property India—Government of India in corresponding ndian Patent Application No. 201917013120, with an English Translation. (5 pages).

* cited by examiner

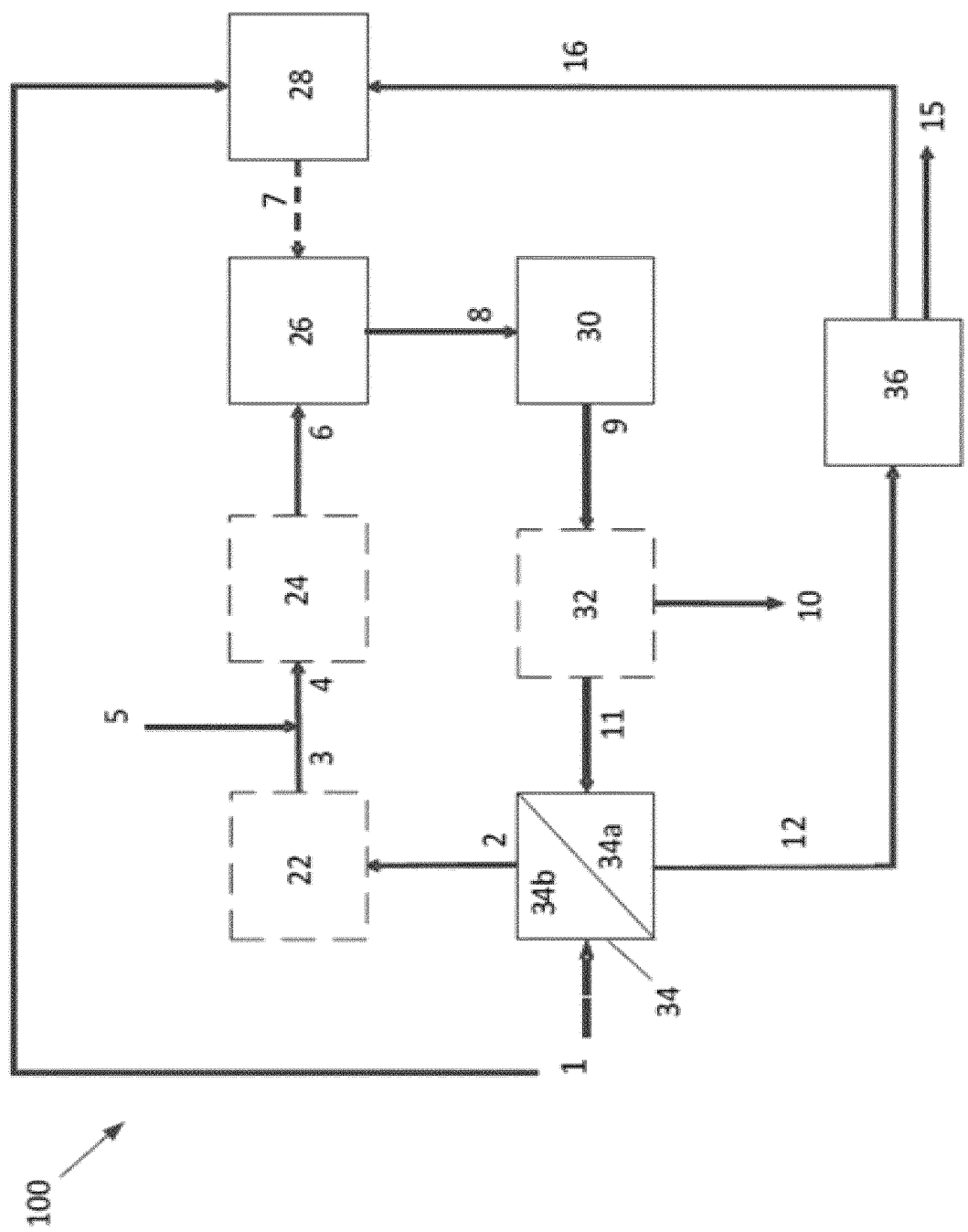

SYSTEM AND PROCESS FOR SYNTHESIS GAS PRODUCTION

FIELD OF THE INVENTION

Embodiments of the invention generally relate to a hydrogen gas production system and a method of producing hydrogen.

BACKGROUND

Hydrogen is an important feedstock in synthesis gas production, where the main feedstock is a hydrocarbon feed stream. The hydrogen is used in hydrogenation, desulfurization, and/or prereforming, in order to facilitate hydrogenation and/or to suppress carbon formation. Typically, the source of the hydrogen is hydrogen recycled from downstream a steam methane reformer where hydrogen is available in synthesis gas. Depending on the configuration of the system for synthesis gas production, hydrogen is typically separated by pressure swing adsorption (PSA), temperature swing adsorption (TSA), or a membrane, followed by a compression in a compressor and then recycled to the hydrocarbon feed stream.

U.S. Pat. No. 5,000,925 discloses a hydrogen and carbon dioxide coproduction apparatus. Steam and a hydrocarbon stream are reformed in a steam reformer 14. Subsequently, carbon monoxide and steam in the reformer effluent react in a shift converter 28 in the presence of a catalyst to form additional hydrogen and carbon dioxide. Subsequently, the processed stream is led to a hydrogen PSA unit 38, from which product hydrogen is withdrawn through line 40 to a storage vessel and hydrogen purge gas is withdrawn via line 42. The hydrogen purge gas is led to a carbon dioxide PSA unit 48 providing a carbon dioxide rich product stream and a hydrogen rich product stream. The hydrogen rich product stream is compressed in compressor 58 to a pressure just above the steam reformer feed pressure and recycled to the reformer 14 where it is combined with the feed to the reformer.

It is an object of the invention to provide an alternative way of providing hydrogen to the feed to a reformer unit of a hydrogen production system and in a method of producing hydrogen. It is in particular an object of the invention to provide a cheaper and/or more reliable way of providing hydrogen to the feed of a reformer unit of a hydrogen production system and in a method of producing hydrogen.

SUMMARY OF THE INVENTION

Embodiments of the invention generally relate to a hydrogen production system and a method of producing hydrogen.

One embodiment of the invention provides a hydrogen production system. The system comprises optionally, one or more gas conditioning stages chosen between the following stages: a hydrogenation stage, a desulfurization stage, and a prereforming stage, where the most upstream stage of the one or more gas conditioning stages is arranged to receive a hydrogen enriched hydrocarbon stream and to process the hydrocarbon feed stream into a conditioned hydrocarbon stream. The system also comprises a steam reformer unit downstream the one or more optional gas conditioning units and a steam addition line arranged to add steam upstream the steam reformer unit. The steam reformer unit is arranged to process the hydrogen enriched hydrocarbon stream or the conditioned hydrocarbon stream together with added steam into a reformed stream. The system further comprises a hydrogen membrane unit downstream the steam reformer unit, where the hydrogen membrane unit comprises a hydrogen permeable membrane and is arranged to allow at least a part of the reformed stream to pass on a first side of the hydrogen permeable membrane and a hydrocarbon feed stream to pass on a second side of the hydrogen permeable membrane. During operation of the system, hydrogen passes from the reformed stream on the first side into the hydrocarbon feed stream on the second side, thereby forming the hydrogen enriched hydrocarbon stream. The system further comprises a separation unit downstream the first side of said hydrogen membrane unit, said separation unit being arranged for separating the reformed stream exiting the first side of the hydrogen membrane unit into a hydrogen product gas and an off-gas.

The reformed stream is passed to the first side of the membrane unit. Hydrogen from the reformed stream passes through the hydrogen permeable membrane from the first to the second side of the hydrogen permeable membrane. Thus, the stream exiting the first part of the membrane unit has a hydrogen content that is diminished a bit compared to the reformed stream upstream the membrane unit. As the membrane typically is permeable for any component, small amounts of the hydrocarbon feed stream may enter into the reformed stream. Thus, the system also comprises a separation unit downstream the membrane unit on the retentate side in order to purify the reformed stream exiting the membrane unit. Thus, the combination of the hydrogen membrane unit and the separation unit provides for cleaning up of the hydrogen product gas, so that both $CO_2$ but also other components, such as methane that has entered into the reformed stream from the hydrocarbon feed stream, are removed from the hydrogen product gas.

By the system of the invention, a hydrogen membrane unit is thus used in order to recycle hydrogen directly into the hydrocarbon feed stream. This is possible due to the fact that the partial pressure of hydrogen in the reformed stream is sufficiently high compared to the hydrogen pressure of the hydrocarbon feed stream to ensure the passage of hydrogen across the hydrogen permeable membrane unit. When the hydrocarbon feed stream is used as a sweep gas in the membrane unit in the system of the invention, the hydrogen is delivered directly into the hydrocarbon feed stream and a compressor arranged to pressurize hydrogen in order to recycle it into the hydrocarbon feed stream is superfluous. This provides for a simpler and cheaper hydrogen production system. Moreover, the energy requirements and maintenance requirements are reduced. Finally, the reliability of the system is improved in that a membrane unit typically is more reliable than a compressor.

The first side of the hydrogen permeable membrane is also denoted the retentate side, and the second side of the hydrogen permeable membrane is also denoted the permeate side, since the main permeation of gasses across the hydrogen permeable membrane is the permeation of hydrogen from the reformed stream into the hydrocarbon feed stream. The reformed stream after passage through the retentate side of the membrane unit is a reformed stream with a slightly lowered amount of hydrogen, while the permeate gas, viz. the hydrogen enriched hydrocarbon stream, is a gas saturated with a desired amount of hydrogen.

The reformed stream entering the first side of the hydrogen membrane unit is a hydrogen rich gas stream. The reformed stream may comprise further components than hydrogen; however, the important feature is that the partial pressure of hydrogen on the first side of the hydrogen permeable membrane is higher than the partial pressure of hydrogen on the retentate side of the hydrogen permeable membrane in order to facilitate transfer of hydrogen from the retentate side to the permeate side.

The one or more gas conditioning stages chosen between a hydrogenation stage, a desulfurization stage and a prereforming stage will be in series. Two or three stages may be individual stages within a single reactor, or any of the stages may be a stage within an individual reactor. If all three stages are present in the system of the invention, the order is typically: a hydrogenation stage, followed by a desulfurization stage followed by a prereforming stage. This is also the typical order, even if only two of the stages are present.

Within the hydrogenation stage, hydrocarbons in the hydrogen enriched hydrocarbon stream are saturated. Within the desulfurization stage, sulfur compounds bound to hydrocarbons in the hydrogen enriched hydrocarbon stream are removed. Within the prereformer stage, prereforming of the hydrogen enriched hydrocarbon stream is carried out. Typically, the prereformer stage is adiabatic. Depending on the composition of the hydrogen enriched hydrocarbon stream, the system may do without any of the one or more conditioning stages, or it may comprise one, two, or three of the gas conditioning stages.

Steam is added to the system upstream of the reformer unit. In a case, where the system comprises a preformer stage, steam should be added upstream the prereformer stage. In this case, steam may be added both upstream the prereformer stage and between the prereformer stage and the reformer unit, or steam may only be added upstream the prereformer stage.

According to an embodiment, the separation unit is a pressure swing adsorption unit a temperature swing adsorption unit, or a combination of a carbon dioxide separation unit and a cold box. A cold box is a unit providing a cryogenic process for separation of a mixture of $H_2$, CO, and other gasses into a substantially pure stream of CO, a substantially pure stream of $H_2$, and a balancing stream of what remains from the feed stream.

In an embodiment of the system according to the invention, the hydrogen membrane unit comprises a polymeric membrane, or a ceramic membrane. A polymeric membrane is advantageous due to its relatively low price. Ceramic membranes are advantageous due to their excellent thermal stability.

In an embodiment of the system according to the invention, the reformed stream and the hydrocarbon feed stream are arranged to pass in counter-current or co-currently in the hydrogen membrane unit. When the reformed stream and the hydrocarbon feed stream pass in counter-current within the hydrogen membrane unit, the largest driving force of the hydrogen permeation is achieved along the length of the membrane as this gives the largest differential pressure. Moreover, if only a relatively small part of the reformed stream is led to the hydrogen membrane unit, it is in particular advantageous that the reformed stream and the hydrocarbon feed stream pass in counter-current.

In an embodiment of the system according to the invention, the membrane unit comprises an outer tube and a plurality of hollow hydrogen permeable membranes. There may be hundreds of hollow fibers in a membrane unit. The outer tube may be a pressure vessel. In an embodiment, the inside of the hollow membranes constitutes the first side, and the room between the outer tube and the hollow hydrogen permeable membranes constitutes the second side. Thus, the reformed stream is fed to the inside of the hollow membranes whilst the hydrocarbon feed stream is fed to the room between the hollow tubes and the outer tube and the flow of hydrogen is an inside-out flow. In another embodiment, the reformed stream is feed to the room between the hollow tubes and the outer tube, whilst the hydrocarbon feed stream is fed to the hollow tubes, and the flow of hydrogen is an outside-in flow.

In an embodiment, the system according to the invention further comprises a water gas shift unit downstream the steam reformer unit and upstream the hydrogen membrane unit, where the water gas shift unit is arranged to convert steam and carbon monoxide in the reformed stream to hydrogen and carbon dioxide. In this case, the stream reaching the membrane unit is both reformed and water gas shifted. However, unless otherwise stated here, the gas reaching the membrane unit is denoted "reformed stream" even if it has also been water gas shifted. It should be noted, that heating, drying and other processing of the gas may take place in addition to the processes described in detail.

Another aspect of the invention provides for a process for hydrogen production, the process comprising the steps of: optionally, passing a hydrogen enriched hydrocarbon stream through one or more gas conditioning stages chosen between the following stages: a hydrogenation stage, a desulfurization stage and a prereforming stage, where the one or more gas conditioning stages is/are arranged to receive the hydrogen enriched hydrocarbon stream and to process the hydrocarbon feed stream into a conditioned hydrocarbon stream; adding steam to the hydrogen enriched hydrocarbon stream or to the conditioned hydrocarbon stream; reforming the hydrogen enriched hydrocarbon stream or the conditioned hydrocarbon stream together with the added steam in a steam reformer unit downstream the one or more gas conditioning units, to a reformed stream; directing at least a part of the reformed stream into a hydrogen membrane unit downstream the steam reformer unit. The hydrogen membrane unit comprises a hydrogen permeable membrane and is arranged to allow at least a part of the reformed stream to pass on a first side of the hydrogen permeable membrane and a hydrocarbon feed stream to pass on a second side of the hydrogen permeable membrane, so that hydrogen passes from the reformed stream on the first side into the hydrocarbon feed stream on the second side, thereby forming the hydrogen enriched hydrocarbon stream. The process further comprises the step of separating the reformed stream exiting the first side of the hydrogen membrane unit into a hydrogen product gas and an off-gas in a separation unit downstream the first side of said hydrogen membrane unit.

In an embodiment, the partial pressure of hydrogen in the reformed stream is between 5 and 25 barg. Preferably, the partial pressure of hydrogen in the reformed stream is between 10 and 25 barg. This allows for sufficient permeation of hydrogen into the hydrocarbon feed stream due to the difference in partial pressure of hydrogen on the two sides of the hydrogen permeable membrane.

Further embodiments of the process correspond to the embodiments of the system described above, with corresponding advantages. These will therefore not be described in detail here.

The following is a detailed description of embodiments of the invention depicted in the accompanying drawing. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

BRIEF DESCRIPTION OF THE DRAWING

FIG. 1 illustrates an embodiment of the hydrogen production system according to the invention.

DETAILED DESCRIPTION OF THE DRAWING

FIG. 1 illustrates an exemplary embodiment of a hydrogen production system 100 according to the invention. The system 100 is arranged to produce a hydrogen stream 15.

The system 100 comprises two gas conditioning units 22, 24. For example, the most upstream gas conditioning unit 22 comprises two gas conditioning stages, viz. a hydrogenation stage and a desulfurization stage. The gas conditioning unit 24 downstream the gas conditioning unit 22 contains a prereforming stage 24, e.g. in the form of an adiabatic prereformer with one or more prereforming catalyst bed(s) (not shown in FIG. 1). Downstream the two gas conditioning units 22, 24 is a steam reformer unit 26 which during operation is heated by a heating unit 28, e.g. one or more rows of burners. The steam reformer unit 26 is arranged to process a hydrogen enriched hydrocarbon stream 2 or a conditioned hydrocarbon stream 6 together with added steam 5 into a reformed stream 8.

A membrane unit 34 is positioned downstream the steam reformer unit 26 and receives a reformed stream 11 which is hydrogen rich.

The reformed stream 8 exiting the steam reformer unit 26 undergoes water gas shift in a shift unit 30, thus becoming a water gas shifted reformed stream 9. The water gas shifted reformed stream 9 is optionally dried by condensing water in a separator unit 32. Typically, the separator unit 32 is positioned upstream the hydrogen membrane unit 34 as shown in FIG. 1, and the stream exiting the separator unit is a dried, water gas shifted and reformed stream 11. Water is outlet from the separator unit in stream 10.

The dotted lines of the units 32, 22 and 24 in FIG. 1 indicate that these units are optional.

During operation of the system 100 a hydrocarbon feed stream 1 is fed to both the heating unit 28 as fuel and as a feed stream 1 to the optional gas conditioning units 22, 24 or to the steam reformer unit 26, via the hydrogen membrane unit 34. The heating unit 28 comprises e.g. a number of burners arranged to burn off the hydrocarbon feed stream 1 as fuel in order to create external heating 7 of tubes (not shown) of the reformer unit 26. The steam reformer unit 26 may be top fired, bottom fired, side fired, or in any other appropriate configuration. Depending on the configuration of burners of the heating unit 28, the heat transfer may take place as convection heating, radiation heating or a combination of both. This is indicated by the arrow 7 in FIG. 1.

The hydrogen membrane unit 34 comprises a hydrogen permeable membrane and is arranged to allow the reformed stream 11 to pass on a first side 34a of the hydrogen permeable membrane and the hydrocarbon feed stream 1 to pass on a second side 34b of the hydrogen permeable membrane, so that during operation of the system 100, hydrogen passes from the reformed stream 11 on the first side 34a into the hydrocarbon feed stream 1 on the second side 34b, thereby forming the hydrogen enriched hydrocarbon stream 2.

This first side 34a of the hydrogen permeable membrane is also denoted the retentate side, and the second side 34b of the hydrogen permeable membrane is also denoted the permeate side, since the main permeation of gasses across the hydrogen permeable membrane is the permeation of hydrogen from the reformed stream 11 into the hydrocarbon feed stream 1. The streams 1 and 11 pass in countercurrent in the system 100; however, the invention is not limited to this configuration and the streams 1 and 11 could alternatively pass the hydrogen membrane unit co-currently.

The reformed stream 11 entering the first side of the hydrogen membrane unit 34 is a gas comprising both hydrogen and carbon monoxide. After passage of the hydrogen membrane unit 34 the components of the gas have changed slightly, thus providing a reformed stream 12. The hydrogen content of the reformed stream 12 after passage of the membrane unit 34, is thus lowered slightly compared to the hydrogen amount in the reformed stream 11, while the permeate gas, viz. the hydrogen enriched hydrocarbon stream 2, is a gas with an increased amount of hydrogen compared to the hydrocarbon feed stream 1. By choosing the right parameters of the hydrogen membrane unit 34, the hydrogen enriched hydrocarbon stream 2 may be saturated with a desired amount of hydrogen.

Steam 5 is added to the system upstream of the reformer unit. In the case, where the system 10 comprises a prereformer unit 24, the steam 5 is added upstream the prereformer unit 24. In the case where the system 10 does not include a prereformer unit 24 or a prereformer stage, steam 5 is to be added upstream the steam reformer unit 26. Alternatively, steam 5 may be added both upstream the prereformer unit 24 and between the prereformer unit 24 and the steam reformer unit 26. In the case where the system 100 comprises both the preconditioning unit 22, e.g. including a hydrogenation stage and a desulfurization stage, the steam 5 is added to the stream 3 exiting the preconditioning unit 22, resulting in the stream 4. The stream 4 is subsequently fed into the second preconditioning unit 24, e.g. an adiabatic prereformer, resulting in the preconditioned stream 6 with added steam (from the steam input 5). The preconditioned stream 6 is fed to the reformer unit 26.

If the system 100 comprises more than one gas conditioning stage, the order of the gas conditioning stages is typically such that a hydrogenation stage, if present, is the most upstream of the gas conditioning stages, followed by a desulfurization stage, if present, whilst the prereforming stage typically is the most downstream of the gas conditioning stages.

The system 100 typically moreover includes a separation unit. This separation unit is a separation unit 32 between the shift unit 30 and the hydrogen membrane unit 34, arranged to separate off water 10 from the reformed and water gas shifted stream 9.

Downstream of the hydrogen membrane unit 34 is a separation unit 36 in the form of an adsorption unit. The adsorption unit 36 is a temperature swing adsorption unit (TSA) or a pressure swing adsorption unit (PSA). The adsorption unit 36 is arranged to separate off undesired parts of the reformed stream 12 as an off gas 16. The off gas 16 typically includes hydrocarbons and may be used as further fuel to the burners of the heating unit 28. The remaining gas 15 from the adsorption unit is the product gas in the form of a hydrogen gas of substantial purity.

As an alternative to an adsorption unit, the separation unit 36 could be a combination of a carbon dioxide separation unit, also denoted a $CO_2$ stripper, and a cold box downstream the $CO_2$ stripper. In this alternative, carbon dioxide in the reformed stream 12 exiting the first side of the hydrogen membrane unit 34 is removed and the resulting gas enters a cold box. A hydrogen product gas of substantial purity, a carbon monoxide gas as well as an off-gas exits the cold box. The off-gas may be used as further fuel to the burners of the heating unit 28.

The streams 11 and 1 pass in countercurrent in the system 100; however, the invention is not limited to this configuration and the streams 1 and 11 could alternatively pass the hydrogen membrane unit co-currently.

By choosing the right parameters of the hydrogen membrane unit 34, the hydrogen enriched hydrocarbon stream 2 may be saturated with a desired amount of hydrogen.

EXAMPLE

In Table 2 below the result of a simulation using a polymer based membrane is given. As an example, a membrane inspired by a polymer type membrane was used for the simulation. The relative permeances of the used membrane is indicated in Table 1 below:

TABLE 1

| Compound | Relative permeance |
| --- | --- |
| $H_2O$ | >400 |
| $H_2$ | 90 |
| $CO_2$ | 30 |
| $O_2$ | 9 |
| CO | 1.8 |
| $N_2$ | 1 |
| $CH_4$ | 0.6 |

Ethane has a relative permeance estimated to 0.06. Thus it is clear that the simulated membrane has a high permeance for hydrogen and a lower permeance for carbon monoxide, nitrogen, methane, and ethane.

In the simulation, a hydrogen rich gas of 0.2% $N_2$, 5.7% $CH_4$, 4.4% CO, 15.4% $CO_2$, and 74.3% $H_2$ was used as a feed to the first side of the hydrogen permeable membrane and a hydrocarbon feed stream of 1.3% $N_2$, 97% $CH_4$, 0.7% $CO_2$, and 1% $C_2H_6$ was used as feed to the second side of the hydrogen permeable membrane. The simulation was simplified to an outer tube having the hydrogen rich gas feed separated from the inner tube with the hydrocarbon feed and a membrane integrated in the wall in-between, with the two feeds entering the configuration in countercurrent. The mass transfer coefficients of the species in Table 2 was scaled to achieve an exit concentration of roughly 2% $H_2$ in the hydrocarbon feed.

The molar flow of the hydrogen rich gas on the first side of the membrane and the hydrocarbon feed stream on the second side of the membrane were identical; however, a gas pressure of 23.5 barg of the hydrogen rich gas was assumed and a hydrocarbon feed stream pressure of 30 barg. It should be noted that any component may travel across the membrane, but that the rate is defined by the relative permeance for the specific membrane and the difference in partial pressure. Thus, $H_2$, $CO_2$, and CO will all travel from the hydrogen rich gas on the first side of the hydrogen permeable membrane and into the hydrocarbon feed stream, because of the partial pressure of the specific gas components determines the direction of the driving force. The actual transfer of the gas components from the hydrogen rich gas to the hydrocarbon feed are in the given case 8479 $Nm^3/h$ for $H_2$, 564 $Nm^3/h$ for $CO_2$, and 11 $Nm^3/h$ for CO, which is the combined effect of differences in partial pressure and the relative permeance of the species.

TABLE 2

| | Flow [$Nm^3/h$] | P [barg] | $N_2$ [%] | $CH_4$ [%] | CO [%] | $CO_2$ [%] | $H_2$ [%] | $C_2H_6$ [%] |
| --- | --- | --- | --- | --- | --- | --- | --- | --- |
| Gas entering the first side of $H_2$ membrane | | | | | | | | |
| In | 382000 | 23.5 | 0.2 | 5.7 | 4.4 | 15.4 | 74.3 | 0.0 |
| Out | 373038 | 23.0 | 0.2 | 5.9 | 4.5 | 15.6 | 73.8 | 0.0 |
| Hydrocarbon feed (second side of $H_2$ membrane) | | | | | | | | |
| In | 382000 | 30.0 | 1.3 | 97.0 | 0.0 | 0.7 | 0.0 | 1.0 |
| Out | 390962 | 30.0 | 1.3 | 94.8 | 0.0 | 0.8 | 2.2 | 1.0 |

As the partial pressure of the hydrocarbons in the hydrocarbon feed stream is higher than the partial pressure thereof in the hydrogen rich gas, hydrocarbons will travel opposite the hydrogen and into the hydrogen rich gas. With an estimated low permeance of $C_2H_6$ and a low partial pressure, the actual flux of these hydrocarbons is very small and almost indifferent from an overall mass balance perspective. However, 91 $Nm^3/h$ of methane was found to be transferred to the hydrogen rich gas from the hydrocarbon feed.

Overall, the results in Table 2 show that the polymer type membrane can facilitate transfer of hydrogen in a single pass membrane with a high selectivity, as 93% of the flux (relative to the total flux in both direction) over the membrane was hydrogen.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:
1. A hydrogen production system comprising:
   optionally, one or more gas conditioning stages chosen between the following stages: a hydrogenation stage, a desulfurization stage and a prereforming stage, where the most upstream stage of the one or more gas conditioning stages is arranged to receive a hydrogen enriched hydrocarbon stream and to process said hydrocarbon feed stream into a conditioned hydrocarbon stream, a steam reformer unit downstream the one or more optional gas conditioning units, a steam addition line arranged to add steam upstream the steam reformer unit, and said steam reformer unit being arranged to process the hydrogen enriched hydrocarbon stream or the conditioned hydrocarbon stream together with added steam into a reformed stream, a hydrogen membrane unit downstream said steam reformer unit, said hydrogen membrane unit comprising a hydrogen permeable membrane and being arranged to allow at least a part of the reformed stream to pass on a first side of said hydrogen permeable membrane and a hydrocarbon feed stream to pass on a second side of said hydrogen permeable membrane, so that during operation of the system hydrogen passes from the reformed stream on the first side into the hydrocarbon feed stream on the second side, thereby forming said hydrogen enriched hydrocarbon stream, and a separation unit downstream the first side of said hydrogen membrane unit, said separation unit being arranged for separating the reformed stream exiting the first side of the hydrogen membrane unit into a hydrogen product gas and an off-gas.

2. The hydrogen production system according to claim 1, wherein said separation unit is a pressure swing adsorption unit, a temperature swing adsorption unit, or a combination of a carbon dioxide separation unit and a cold box.

3. The hydrogen production system according to claim 1, wherein the hydrogen membrane unit comprises a polymeric membrane or a ceramic membrane.

4. The hydrogen production system according to claim 1, wherein the reformed stream and the hydrocarbon feed stream are arranged to pass in counter-current or co-currently in the hydrogen membrane unit.

5. The hydrogen production system according to claim 1, wherein said membrane unit comprises an outer tube and a plurality of hollow hydrogen permeable membranes.

6. The hydrogen production system according to claim 1, further comprising a water gas shift unit downstream said steam reformer unit and upstream said hydrogen membrane unit, said water gas shift unit being arranged to convert steam and carbon monoxide in the reformed stream to hydrogen and carbon dioxide.

7. A process for hydrogen gas production, said process comprising the steps of:

optionally, passing a hydrogen enriched hydrocarbon stream through one or more gas conditioning stages chosen between the following stages: a hydrogenation stage, a desulfurization stage and a prereforming stage, where the one or more gas conditioning stages is/are arranged to receive the hydrogen enriched hydrocarbon stream and to process said hydrocarbon feed stream into a conditioned hydrocarbon stream, adding steam to the hydrogen enriched hydrocarbon stream or to the conditioned hydrocarbon stream, reforming said hydrogen enriched hydrocarbon stream or the conditioned hydrocarbon stream together with the added steam in a steam reformer unit downstream the one or more gas conditioning units, to a reformed stream, directing at least a part of said reformed stream into a hydrogen membrane unit downstream said steam reformer unit, said hydrogen membrane unit comprising a hydrogen permeable membrane and being arranged to allow at least a part of the reformed stream to pass on a first side of said hydrogen permeable membrane and a hydrocarbon feed stream to pass on a second side of said hydrogen permeable membrane, so that hydrogen passes from the reformed stream on the first side into the hydrocarbon feed stream on the second side, thereby forming said hydrogen enriched hydrocarbon stream; and separating the reformed stream exiting the first side of the hydrogen membrane unit into a hydrogen product gas and an off-gas in a separation unit downstream the first side of said hydrogen membrane unit.

8. The process according to claim 7, wherein said separation unit is a pressure swing adsorption unit, a temperature swing adsorption unit, or a combination of a carbon dioxide separation unit and a cold box.

9. The process according to claim 7, wherein the partial pressure of hydrogen in the reformed stream is between 5 and 25 barg.

10. The process according to claim 7, wherein the hydrogen membrane unit comprises a polymeric membrane, or a ceramic membrane.

11. The process according to claim 7, wherein the reformed stream and the hydrocarbon feed stream pass in counter-current or co-currently in the hydrogen membrane unit.

12. The process according to claim 7, further comprising the step of dividing off a first part of the reformed stream and passing only said first part on to said first side of said hydrogen membrane unit.

13. The process according to claim 7, wherein said membrane unit comprises an outer tube and a plurality of hollow hydrogen permeable membranes.

14. The process according to claim 7, further comprising the step of:

converting steam and carbon monoxide in the reformed stream to hydrogen and carbon dioxide in a water gas shift unit downstream said steam reformer unit and upstream said hydrogen membrane unit.

15. The process according to claim 7, further separating off water from the stream exiting a retentate side of the hydrogen membrane unit.

* * * * *